United States Patent [19]

Grossman et al.

[11] Patent Number: 5,862,145

[45] Date of Patent: Jan. 19, 1999

[54] METHOD AND SYSTEM FOR IDENTIFYING AN ERROR CONDITION DUE TO A FAULTY CABLE CONNECTION IN AN ETHERNET NETWORK

[75] Inventors: Leonid Grossman, Cupertino; Ramkrishna Vepa, Fremont, both of Calif.

[73] Assignee: Advanced Micro Devices, Inc., Sunnyvale, Calif.

[21] Appl. No.: 713,063

[22] Filed: Sep. 12, 1996

[51] Int. Cl.[6] ..................................................... G06F 11/00
[52] U.S. Cl. ................. 371/5.1; 395/183.19; 395/185.01
[58] Field of Search ............................... 371/5.1, 48, 5.3; 395/183.19, 185.01

[56] References Cited

U.S. PATENT DOCUMENTS

| 5,210,865 | 5/1993 | Davis et al. | 395/575 |
| 5,293,600 | 3/1994 | Vriezen | 395/425 |
| 5,671,228 | 9/1997 | Nagashima | 371/5.1 |

FOREIGN PATENT DOCUMENTS

| 0334510 A | 9/1989 | European Pat. Off. . |
| 0647044 A | 4/1995 | European Pat. Off. . |

OTHER PUBLICATIONS

IEEEGlobal Telecommunications Conference, vol. 2, Dec. 1985, USA, pp. 848–851, XP002040037, E.J. Donofrio, "The Experimental Communication System for Voice/ Data on the Ethernet".

Wescon Technical Papers, vol. 35, Nov. 1991, USA, pp. 232–237, XP000320542, Ian Crayford, "10Base–T In the Office".

IBM Technical Disclosure Bulletin, vol. 36, No. 1, Jan. 1993, New York, US, pp. 119–123, XP002040052, Anonymous, "Telecommunications Error Logging Control Method".

*Primary Examiner*—Phung My Chung
*Attorney, Agent, or Firm*—Sawyer & Associates

[57] ABSTRACT

A method for identifying an error condition due to a faulty cable connection in a network comprising a plurality of computer systems, at least one of the computer systems including a network adapter with the network adapter including a media access control (MAC) unit, includes initializing a plurality of mechanisms for tracking a plurality of conditions in the MAC of the network adapter. The method further includes receiving a transmit demand request in the network adapter and updating the plurality of mechanisms according to a current status of each of the plurality of conditions. In addition, the method includes determining whether a predetermined threshold has been reached in one or more of the plurality of mechanisms, wherein when one or more of the plurality of mechanisms has reached the predetermined threshold, a faulty cable connection is identified. In a system aspect, the system includes a plurality of counting mechanism for tracking each of a plurality of error conditions. The system further includes a media access control (MAC) unit for differentiating each of the plurality of error conditions. In addition, the system includes an error identification mechanism for determining when any of the plurality of counting mechanisms has reached a predetermined threshold.

23 Claims, 3 Drawing Sheets

METHOD AND SYSTEM FOR IDENTIFYING AN ERROR CONDITION DUE TO A FAULTY CABLE CONNECTION IN AN ETHERNET NETWORK

FIELD OF THE INVENTION

The present invention relates to computer network systems and more particularly to identification of faulty cable/disconnect conditions in a computer network system.

BACKGROUND OF THE INVENTION

In many computing environments, computer systems are interlinked in local area networks (LANs). Proper operation of these networks is important for maintaining productivity. With networks providing more convenient resource-sharing among users, problems arising from network errors limit the full utilization of the conveniences.

One of the most important of these errors to resolve is an error due to the presence of a faulty cable or a disconnected cable from either the network card in the computer system or the main hub/server of the network. Unfortunately, the protocol for most systems merely indicates a high level error under such circumstances, e.g., 'network driver doesn't exist anymore', which does not provide a clear indication that the error is due to a faulty cable/disconnect situation. Detection of an error due to a faulty cable/disconnect is not only important to allow quicker recovery, but also to distinguish the error from other problems, such as set-up issues and bad adapter situations. Further, with some specifications, such as Microsoft NDIS 4 as used in Windows 95 and in Windows NT, identification of a cable disconnect has become a formal requirement of certification for the Ethernet hardware and software.

Accordingly, a need exists for identification of errors due to a faulty cable or cable disconnect condition in computer networking environments. The present invention addresses such a need.

SUMMARY OF THE INVENTION

In the present invention, these needs are met through method and system aspects for identifying an error condition due to a faulty cable connection in a network comprising a plurality of computer systems, at least one of the computer systems including a network adapter with the network adapter including a media access control (MAC) unit. In a method aspect, the method includes initializing a plurality of mechanisms for tracking a plurality of conditions in the MAC of the network adapter, and receiving a transmit demand request in the network adapter. The method further includes updating the plurality of mechanisms according to a current status of each of the plurality of conditions, and determining whether a predetermined threshold has been reached in one or more of the plurality of mechanisms, wherein when one or more of the plurality of mechanisms has reached the predetermined threshold, a faulty cable connection is identified.

In a system aspect, the system includes a plurality of counting means for tracking each of a plurality of error conditions. The system further includes a media access control (MAC) unit for differentiating each of the plurality of error conditions. In addition, the system includes an error identification means for determining when any of the plurality of counting means has reached a predetermined threshold.

For the present invention, the plurality of conditions being tracked includes a signalling of a lost carrier condition, and a signalling of a retry condition. The conditions further include an indication that a semaphore for a current transmit resource belongs to the MAC.

Through the present invention, improved identification of disconnected or faulty cable connections in a network is capably achieved. Further, the present invention provides flexibility in tracking several conditions indicative of faulty cable connections and in allowing network-dependent threshold value setting for utilization in the tracking. These and other advantages of the aspects of the present invention will be more fully understood in conjunction with the following detailed description and accompanying drawings.

DETAILED DESCRIPTION

The present invention relates to identification of network errors caused by faulty cable or cable disconnect conditions. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1A:
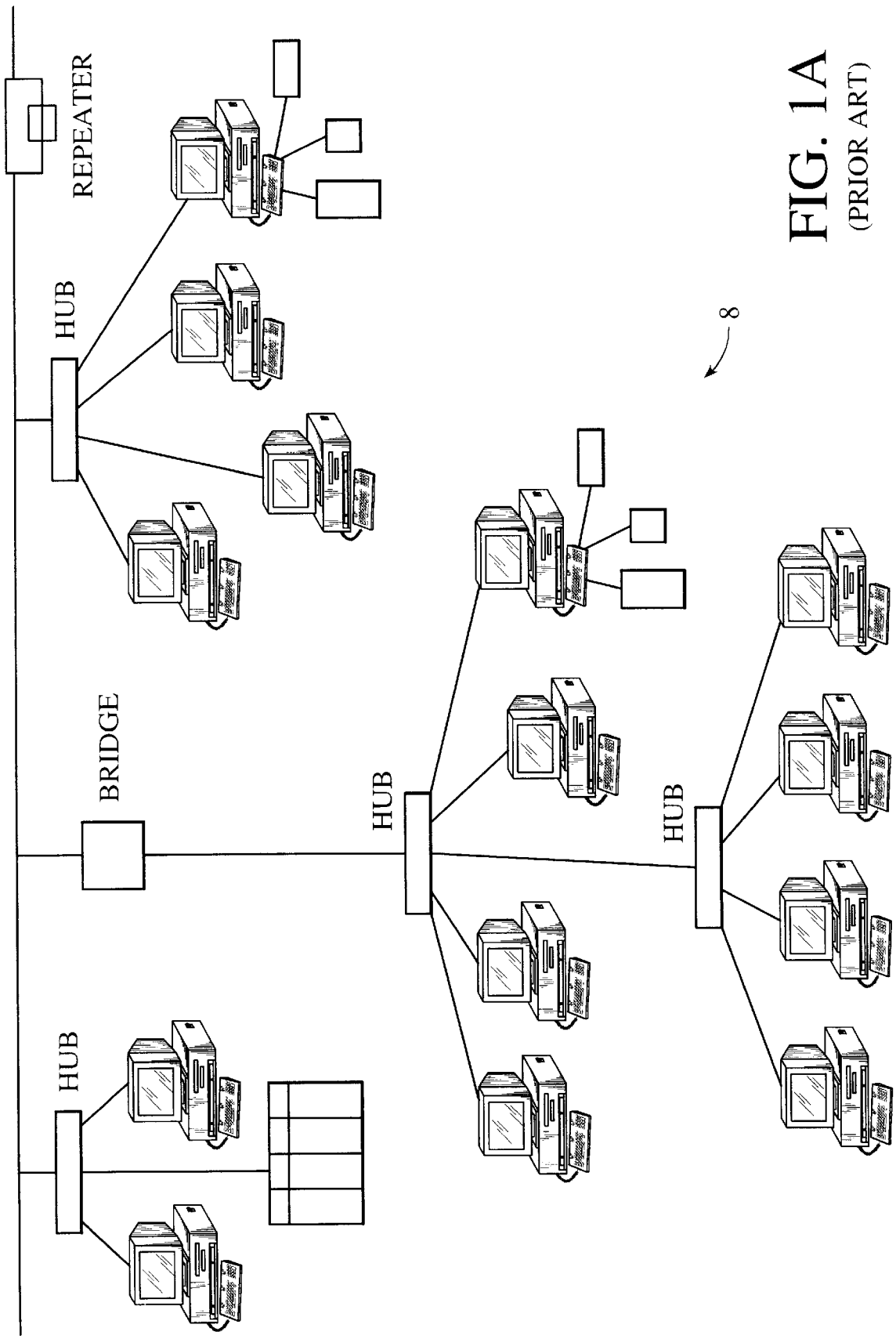
FIG. 1a illustrates a portion of a typical computer network.
Figure 1B:
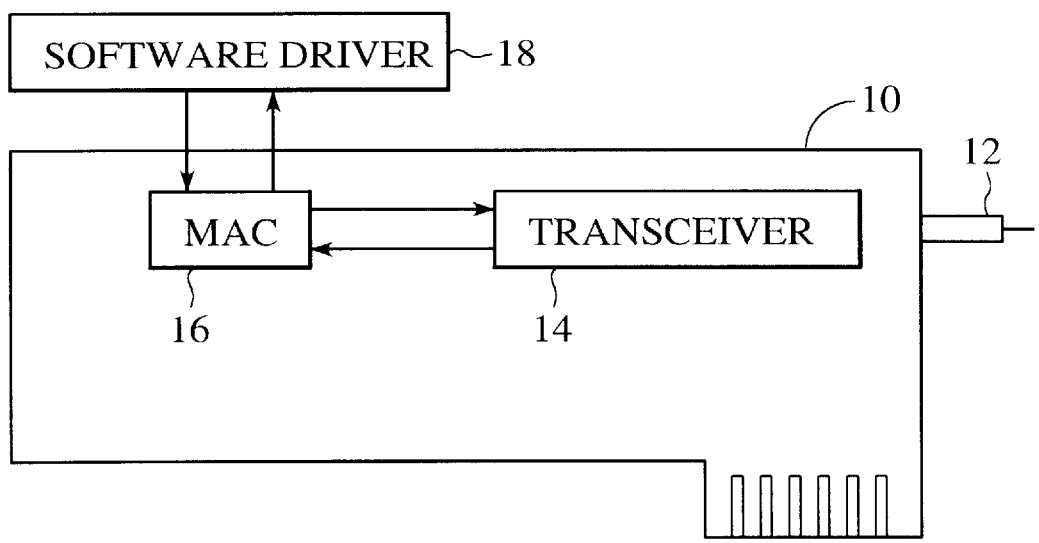
FIG. 1b illustrates a block diagram of a typical network adapter.

In determining the existence of a cable disconnect or faulty cable problem, referred to herein as the error condition, preferably identification of the problem occurs in software so that an indication to a system's own diagnostic or higher level protocol is achieved in order for the information to be passed to a user or system administrator. FIG. 1a illustrates a block diagram of a typical computer network 8. Included in one or more of the systems forming network 8 is a network adapter 10, as illustrated by the block diagram of FIG. 1b, to which a network cable 12, such as 10 BASE-T, 10 BASE-2, or thick Ethernet cable, attaches. A transceiver 14 included in the network adapter 10 as an Ethernet controller is physically connected to the cable 12 and thus senses whether the cable is properly connected and working. Further included in the network adapter 10 is a media access control (MAC) unit 16, which communicates with the transceiver 14. By way of example, MAC 16 is typically a single chip, such as MAC AM 79C960 available from Advanced Micro Devices (AMD), Sunnyvale, Calif. A software driver 18 within the computer system communicates with the MAC 16 to access registers, memory and structures within the MAC 16.

Since the driver 18 communicates with the MAC 16 and is unable to communicate with the transceiver 14 directly, difficulty in accurately identifying the error condition occurs. Such difficulty decreases the ability of the driver 18 to perform differently in terms of the protocol when the error condition exists. For example, when transmission of a packet is attempted and a collision occurs, or heavy traffic results in a lack of resources in the MAC 16, the packet is typically queued for a later transmission request. When the error condition is present, attempts to queue the packet typically occur indefinitely, until either the driver or protocol exhausts its resources. Once the resources are exhausted, the system can fail or lock, forcing a reboot without notification of the existence of the error condition. The problem then continues until the actual problem of the faulty cable/cable disconnect is identified.

Difficulty in identifying the error condition further exists due to the differences among available transceivers 14 for networks. MAC 16 capably autodetects the type of transceiver 14 connected, as is well understood by those skilled in the art, and suitably is used to determine conditions within the transceiver indicating the error condition to the driver 18.

In accordance with the present invention, three separate conditions are used to identify a no cable/faulty cable Ethernet connection. It should be appreciated that the following describes conditions as would be present when using the aforementioned AMD MAC device. Of course, the description is meant as illustrative and not restrictive of the present invention, so that other MAC devices that have equivalent capabilities to determine such conditions are also suitable. It should be further appreciated that the following is suitably implemented using standard computer programming languages, such as with C, C++, etc.

Figure 2:
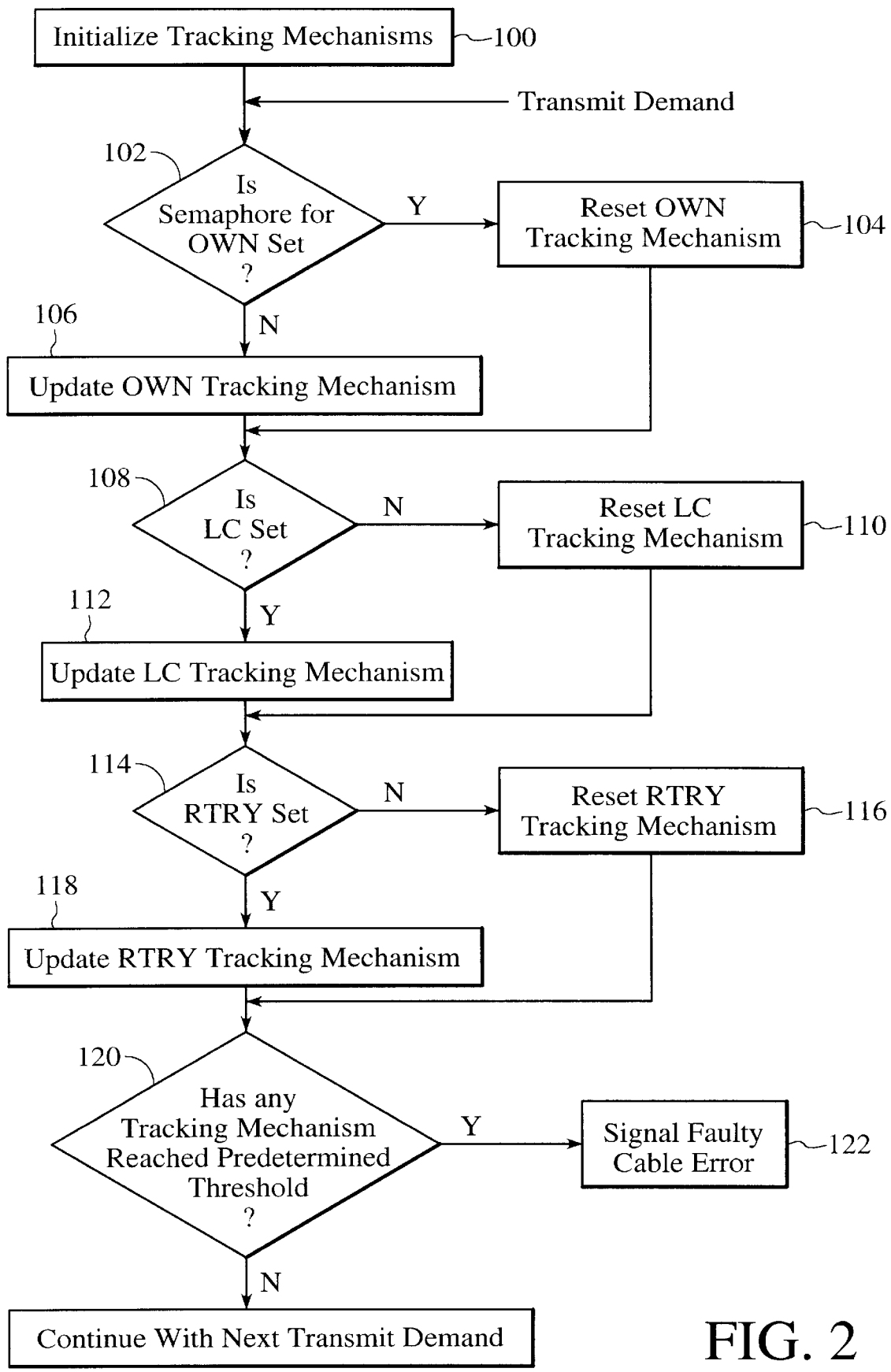
FIG. 2 illustrates a flow diagram for faulty/disconnected cable error detection in an Ethernet network in accordance with the present invention.

The three conditions used to determine the error condition due to a faulty cable/disconnected cable preferably include presence of a lost carrier signal for a predetermined period, presence of a retry error signal for a predetermined period, and status of a semaphore, e.g., an 'own' bit in MAC 16, indicating whether a current resource belongs to the MAC or the driver, over a predetermined period. FIG. 2 provides a flow diagram illustrating a preferred determination of the error condition that utilizes these three hardware conditions in accordance with the present invention.

The determination begins with an initialization of a tracking mechanism for each of the error conditions (step 100). By way of example, three counters are initialized to zero values, e.g., a counter 'LC' for counting the number of times a lost carrier signal has occurred, a counter 'own' for counting a number of times an own bit is at a particular level, and a counter 'rtry' for counting the number of times a retry signal has occurred. Upon the occurrence of a transmit demand signal, the determination continues by checking the status of the error condition tracking mechanisms. It should be appreciated that the order in which the error conditions are checked is not limited to that described and may be altered according to system needs. A check is made (step 102) to determine whether the own bit is set. When set, the status indicates that a transmit resource in the MAC 16, e.g., a descriptor, belongs to the driver 18, and thus transmission is attempting to occur properly. The 'own' tracking mechanism, e.g., the 'own' counter, is then suitably reset to a zero value (step 104). When the own bit is not set, the status indicates that the resource belongs to the MAC 16, and thus transmission is not properly occurring. Accordingly, the 'own' tracking mechanism is updated, e.g., the 'own' counter is incremented, (step 106).

A next check determines whether a bit monitoring the status of the lost carrier signal in a register of the MAC 16 is set (step 108). When not set, the lost carrier signal is not asserted, and thus the tracking mechanism, e.g., the 'LC' counter, is reset to a zero value (step 110). When set, indicating the lost carrier signal is asserted, the 'LC' tracking mechanism is suitably updated, e.g., the 'LC' counter is incremented (step 112). In a similar manner, a check is then made to determine whether a bit monitoring the status of the retry signal in a register of the MAC 16 is set (step 114). When not set, indicating that the retry signal has not been asserted, the tracking mechanism, e.g., the 'rtry' counter, is reset to a zero value (step 116). When set, indicating a retry signal is asserted, the 'rtry' tracking mechanism is appropriately updated, e.g., the 'rtry' counter is incremented, (step 118).

The process then continues by determining whether the tracking mechanism for any of the conditions, e.g., the 'own' counter, 'LC' counter, or 'rtry' counter, has reached a predefined threshold (step 120). By way of example, a counter value of ten has been found by the inventors to be a suitable threshold value. Alternatively, the threshold value may be adaptive to the time-based conditions or traffic-based conditions for a particular network. For example, the status of the own bit may not change for a particular period of time depending on the speed of the system. Thus, a worst-case time period for a packet to be transmitted by the MAC 16 is also suitable for use as the threshold value. For the retry and lost carrier thresholds, the driver 18 could suitably monitor the traffic on the network and the rate of network transmission to adjust the threshold value to a more customized value for a particular network. For example, the count value is increased or decreased to adjust the threshold value according to the monitored rate of traffic.

When the threshold has not been reached in any of the tracking mechanisms, the process continues as described from step 112 upon the occurrence of a next transmit demand. When the threshold has been reached in any of the three tracking mechanisms, a cable disconnect/faulty cable error condition is identified to the driver 18 (step 122), so that a definitive error message for the error condition is suitably transmitted to a user/system administrator. Further, the driver 18 also suitably stops attempts to transmit the packet to avoid exhausting system resources.

Thus, with the present invention, an efficient technique for identifying any of a plurality of conditions likely to indicate a faulty cable or disconnected cable condition in an Ethernet network is provided. Such efficient identification further increases the speed of recovery from such errors, since reconnecting/replacing the cable is a fairly straightforward procedure for any user/system administrator. In addition, the ability to specifically identify a bad cable condition helps distinguish the problem from other problems, such as set-up issues or bad network adapter problems, often a possibility under current error identification routines.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

What is claimed is:

1. A method for identifying an error condition due to a faulty cable connection in a network comprising a plurality of computer systems, at least one of the computer systems including a network adapter, the network adapter including a media access control (MAC) unit, the method comprising:

initializing a plurality of mechanisms for tracking a plurality of conditions in the MAC of the network adapter;

receiving a transmit demand request in the network adapter;

updating the plurality of mechanisms according to a current status of each of the plurality of conditions; and determining whether a predetermined threshold has been reached in one or more of the plurality of mechanisms, wherein when one or more of the plurality of mechanisms has reached the predetermined threshold, a faulty cable connection is identified.

2. The method of claim 1 wherein the plurality of conditions further comprises a signalling of a lost carrier condition.

3. The method of claim 1 wherein the plurality of conditions further comprises a signalling of a retry condition.

4. The method of claim 1 wherein the plurality of conditions further comprises an indication that a semaphore for a current transmit resource belongs to the MAC.

5. The method of claim 4 wherein the semaphore further comprises an own bit.

6. The method of claim 4 wherein the predetermined threshold further comprises a time-based threshold.

7. The method of claim 6 wherein the time-based threshold further comprises a system dependent worst-case time period for a packet to be transmitted from the MAC.

8. The method of claim 1 wherein the plurality of mechanisms further comprises a plurality of counters.

9. The method of claim 8 wherein the predetermined threshold further comprises a predetermined count value in any of the plurality of counters.

10. The method of claim 9 wherein the predetermined count value is ten.

11. The method of claim 8 wherein the predetermined threshold further comprises a traffic-based threshold that alters a maximum count value in the plurality of counters based on a rate of traffic on the network.

12. A method for identifying an error condition due to a faulty cable connection in a network comprising a plurality of computer systems, at least one of the computer systems including a network adapter, the network adapter including a media access control (MAC) unit, the method comprising:

initializing a plurality of counters to a count value of zero, each of the plurality of counters corresponding to each of a plurality of error conditions;

incrementing the count value of one or more of the plurality of counters when one or more of the error conditions has been identified; and signaling a faulty cable error condition when one or more of the plurality of counters has reached a predetermined count value.

13. The method of claim 12 wherein the predetermined count value is ten.

14. The method of claim 12 wherein the plurality of error conditions further comprises a signalling of a lost carrier condition.

15. The method of claim 12 wherein the plurality of error conditions further comprises a signalling of a retry condition.

16. The method of claim 12 wherein the plurality of error conditions further comprises an indication that a semaphore for a current transmit resource belongs to the MAC.

17. The method of claim 16 wherein the semaphore further comprises an own bit.

18. A system for identifying an error condition due to a faulty cable connection in a network comprising a plurality of computer systems, at least one of the computer systems including a network adapter, the system comprising:

a plurality of counting means for tracking each of a plurality of error conditions;

a media access control (MAC) unit for differentiating each of the plurality of error conditions; and an error identification means for determining when any of the plurality of counting means has reached a predetermined threshold, wherein the error identified is due to a faulty cable connection.

19. The system of claim 18 wherein the predetermined threshold further comprises a count value of ten.

20. The system of claim 18 wherein the plurality of error conditions further comprises a lost carrier condition.

21. The system of claim 18 wherein the plurality of error conditions further comprises a retry condition.

22. The system of claim 18 wherein the plurality of error conditions further comprises an indication that a semaphore for a current transmit resource belongs to the MAC.

23. The system of claim 22 wherein the semaphore further comprises an own bit.

* * * * *